United States Patent
Du et al.

(10) Patent No.: US 10,291,614 B2
(45) Date of Patent: May 14, 2019

(54) METHOD, DEVICE, AND SYSTEM FOR IDENTITY AUTHENTICATION

(71) Applicant: CHINA IWNCOMM CO., LTD., Xi'an, Shaanxi (CN)

(72) Inventors: Zhiqiang Du, Shaanxi (CN); Jun Cao, Shaanxi (CN); Manxia Tie, Shaanxi (CN); Yi Li, Shaanxi (CN)

(73) Assignee: CHINA IWNCOMM CO., LTD., Xi'an, Shaanxi (CN)

(*) Notice: Subject to any disclaimer, the term of this patent is extended or adjusted under 35 U.S.C. 154(b) by 0 days.

(21) Appl. No.: 14/384,445

(22) PCT Filed: Mar. 12, 2013

(86) PCT No.: PCT/CN2013/072497
§ 371 (c)(1),
(2) Date: Sep. 11, 2014

(87) PCT Pub. No.: WO2013/135171
PCT Pub. Date: Sep. 19, 2013

(65) Prior Publication Data
US 2015/0128238 A1    May 7, 2015

(30) Foreign Application Priority Data
Mar. 12, 2012 (CN) .......................... 2012 1 0063650

(51) Int. Cl.
*H04L 29/06* (2006.01)
*H04L 9/32* (2006.01)

(52) U.S. Cl.
CPC .......... *H04L 63/0884* (2013.01); *H04L 9/321* (2013.01); *H04L 9/3247* (2013.01);
(Continued)

(58) Field of Classification Search
CPC ...... H04L 63/08; H04L 63/0884; H04L 9/321
See application file for complete search history.

(56) References Cited

U.S. PATENT DOCUMENTS

| 5,491,750 A | 2/1996 | Bellare et al. |
| 6,094,485 A * | 7/2000 | Weinstein et al. ............. 380/30 |

(Continued)

FOREIGN PATENT DOCUMENTS

| CN | 1581183 A | 2/2005 |
| CN | 1630405 A | 6/2005 |

(Continued)

OTHER PUBLICATIONS

Housley et al.; RFC 3280—Internet X.509 Public Key Infrastructure Certificate and Certificate Revocation List (CRL) Profile; 2002; Retrieved from the Internet <URL: ietf.org/rfc/rfc3280.txt.pdf>; pp. 1-129 as printed.*

(Continued)

*Primary Examiner* — Aravind K Moorthy
*Assistant Examiner* — Michael W Chao
(74) *Attorney, Agent, or Firm* — Cantor Colburn LLP

(57) ABSTRACT

The present invention relates to the field of identity authentication. Provided are a method, device, and system for identity authentication, solving the technical problem that existing identity authentication technologies are incapable of protecting personal privacy, and that authentication technologies comprising personal privacy must provide a traceability feature. The method for identity authentication mainly comprises: a first authenticator transmitting to a second authenticator a first identity authentication message; the second authenticator transmitting to an authentication server a second identity authentication message; the authentication server verifying the validity of a secure domain where the second authenticator is at on the basis of the second identity authentication message; the authentication server returning to the second authenticator a third identity authentication message; when the third identity authentication message is received by the second authenticator, same (Continued)

transmitting to the first authenticator a fourth identity authentication message.

18 Claims, 4 Drawing Sheets

(52) U.S. Cl.
CPC .......... *H04L 63/08* (2013.01); *H04L 63/0869* (2013.01); *H04L 63/0421* (2013.01); *H04L 2209/42* (2013.01)

(56) References Cited

U.S. PATENT DOCUMENTS

| | | | |
|---|---|---|---|
| 7,181,614 B1 | 2/2007 | Gehrmann et al. | |
| 7,418,596 B1 | 8/2008 | Carroll et al. | |
| 7,529,925 B2 | 5/2009 | Harkins | |
| 7,577,425 B2 | 8/2009 | Okazaki et al. | |
| 8,356,179 B2 | 1/2013 | Tie et al. | |
| 8,392,710 B2 | 3/2013 | Tie et al. | |
| 8,413,256 B2 | 4/2013 | Gonzalez et al. | |
| 9,225,728 B2* | 12/2015 | Du ..................... | H04L 9/3255 |
| 9,881,298 B2* | 1/2018 | Flitcroft ............... | G06Q 20/00 |
| 9,909,879 B2* | 3/2018 | VonDerheide ......... | G01C 21/20 |
| 2002/0004900 A1 | 1/2002 | Patel | |
| 2002/0076042 A1 | 6/2002 | Sandhu et al. | |
| 2002/0197979 A1 | 12/2002 | Vanderveen et al. | |
| 2003/0028484 A1* | 2/2003 | Boylan et al. .................. | 705/40 |
| 2003/0070080 A1* | 4/2003 | Rosen .................... | G06Q 20/02 |
| | | | 713/187 |
| 2003/0190046 A1* | 10/2003 | Kamerman ............. | H04L 9/006 |
| | | | 380/286 |
| 2003/0195857 A1 | 10/2003 | Acquisti | |
| 2004/0059685 A1 | 3/2004 | Sakamura et al. | |
| 2004/0073814 A1 | 4/2004 | Miyazaki et al. | |
| 2004/0260926 A1 | 12/2004 | Arditti Modiano et al. | |
| 2005/0081038 A1* | 4/2005 | Arditti Modiano ... | H04L 9/3255 |
| | | | 713/176 |
| 2005/0097316 A1 | 5/2005 | Kim | |
| 2005/0143065 A1 | 6/2005 | Pathan et al. | |
| 2005/0257260 A1 | 11/2005 | Lenoir et al. | |
| 2005/0283608 A1 | 12/2005 | Halcrow et al. | |
| 2006/0135141 A1 | 6/2006 | Wilson et al. | |
| 2006/0274695 A1 | 12/2006 | Krishnamurthi et al. | |
| 2006/0281442 A1 | 12/2006 | Lee et al. | |
| 2007/0106892 A1* | 5/2007 | Engberg ................. | G06Q 20/02 |
| | | | 713/168 |
| 2007/0242830 A1 | 10/2007 | Conrado et al. | |
| 2008/0091941 A1 | 4/2008 | Yonezawa et al. | |
| 2008/0178005 A1 | 7/2008 | Gentry | |
| 2008/0184350 A1 | 7/2008 | Chu | |
| 2008/0222425 A1 | 9/2008 | Buss | |
| 2008/0270798 A1 | 10/2008 | Charles et al. | |
| 2009/0089575 A1 | 4/2009 | Yonezawa et al. | |
| 2009/0254750 A1 | 10/2009 | Bono et al. | |
| 2009/0276630 A1 | 11/2009 | Teranishi | |
| 2009/0310510 A1 | 12/2009 | Corrao et al. | |
| 2010/0060233 A1 | 3/2010 | Kung et al. | |
| 2010/0169650 A1* | 7/2010 | Brickell ................ | H04L 9/3066 |
| | | | 713/176 |
| 2010/0306839 A1* | 12/2010 | Tie ...................... | H04L 9/3213 |
| | | | 726/9 |
| 2011/0055556 A1 | 3/2011 | Choi et al. | |
| 2011/0078438 A1 | 3/2011 | Tie et al. | |
| 2011/0154045 A1 | 6/2011 | Lee et al. | |
| 2012/0072732 A1 | 3/2012 | Canard et al. | |
| 2012/0271692 A1* | 10/2012 | Huang ................... | G06Q 30/06 |
| | | | 705/14.23 |
| 2012/0284518 A1 | 11/2012 | Walker et al. | |
| 2013/0227289 A1 | 8/2013 | Du et al. | |
| 2013/0232551 A1 | 9/2013 | Du et al. | |
| 2014/0230027 A1 | 8/2014 | Cha et al. | |
| 2015/0035540 A1 | 2/2015 | Xiang | |
| 2015/0069951 A1 | 3/2015 | Wang et al. | |
| 2018/0025334 A1* | 1/2018 | Pourfallah ............. | G06Q 20/10 |
| | | | 705/4 |
| 2018/0053157 A1* | 2/2018 | Roffey ................. | G06Q 20/206 |
| 2018/0227140 A1* | 8/2018 | Ansari .................. | G06Q 30/04 |
| 2018/0278597 A1* | 9/2018 | Helms ................. | H04L 63/0428 |

FOREIGN PATENT DOCUMENTS

| | | |
|---|---|---|
| CN | 1645393 A | 7/2005 |
| CN | 1668005 A | 9/2005 |
| CN | 1805341 A | 7/2006 |
| CN | 1835008 A | 9/2006 |
| CN | 1934823 A | 3/2007 |
| CN | 101136928 A | 3/2008 |
| CN | 101141711 A | 3/2008 |
| CN | 101145910 A | 3/2008 |
| CN | 404247223 A | 8/2008 |
| CN | 101286844 A | 10/2008 |
| CN | 101364876 A | 2/2009 |
| CN | 101374153 A | 2/2009 |
| CN | 101453476 A | 6/2009 |
| CN | 101599059 A | 12/2009 |
| CN | 101621374 A | 1/2010 |
| CN | 101635624 A | 1/2010 |
| CN | 101640593 A | 2/2010 |
| CN | 101645776 A | 2/2010 |
| CN | 101764742 A | 6/2010 |
| CN | 101888297 A | 11/2010 |
| CN | 101984577 A | 3/2011 |
| CN | 101997688 A | 3/2011 |
| EP | 2257021 A1 | 12/2010 |
| EP | 2282444 A1 | 2/2011 |
| EP | 2639999 A1 | 7/2011 |
| JP | 63036634 A | 2/1988 |
| JP | 2001134181 A | 5/2001 |
| JP | 2003134109 A | 5/2003 |
| JP | 2003218954 A | 7/2003 |
| JP | 2003234740 A | 8/2003 |
| JP | 2004054905 A | 2/2004 |
| JP | 2007049379 A | 2/2007 |
| JP | 2008511223 A | 4/2008 |
| JP | 2009027708 A | 2/2009 |
| JP | 2009033740 A | 2/2009 |
| JP | 2013544052 A | 12/2013 |
| WO | 0001108 A2 | 1/2000 |
| WO | 0190968 A1 | 11/2001 |
| WO | 2006021236 A1 | 3/2006 |
| WO | 2006099540 A2 | 9/2006 |
| WO | 2007030213 A2 | 3/2007 |

OTHER PUBLICATIONS

Menezes et al.; A Handbook of Applied Cryptography; 1996; Retrieved from the Internet <URL: http://math.fau.edu/bkhadka/Syllabi/A%20handbook%20of%20applied%20cryptography.pdf>; pp. 1-13, as printed (Year: 1996).*

No stated author; Open Financial Exchange Specification 2.1.1; 2006; Retrieved from the Internet <URL: http://www.ofx.net/downloads.html>; pp. 1-665, as printed. (Year: 2006).*

International Search Report for International Application No. PCT/CN2013/072497; dated Jun. 20, 2013; with English Translation.

Extended European Search Report corresponding to Application No. 13760980.6-1870/2827529, PCT/CN2013072497, dated Mar. 25, 2015.

Korean First Office Action corresponding to Application No. 10-2014-7028097; Filing Date: Dec. 30, 2015.

Extended European Search Report corresponding to Application No. 13760861.8-1870/2827528 PCT/CN2013/072494; dated Sep. 9, 2015.

Extended European Search Report corresponding to Application No. 13760861.8-1870/2827528, PCT/CN2013/072494; dated Apr. 14, 2015.

Extended European Search Report corresponding to Application No. 13761320.4-1870/2827540, PCT/CN2013/072501; dated Feb. 11, 2015.

(56) References Cited

OTHER PUBLICATIONS

International Search Report for international Applicaiton No. PCT/CN2013/072501; dated Jun. 20, 2013.
International Search Report for international Application No. PCT/CN2013/072494; dated Jun. 13, 2013 with English Translation.
Japanese First Office Action corresponding to Application No. 2014-561278; dated Nov. 4, 2015, with English translation.
U.S. Final Office Action corresponding to U.S. Appl. No. 14/384,425; dated Jun. 10, 2016.
U.S. Non-Final Office Action corresponding to U.S. Appl. No. 14/384,425; dated Jan. 4, 2016.
U.S. Non-Final Office Action corresponding to U.S. Appl. No. 14/384,432; dated Apr. 22, 2015.
A. Menezes et al.,"Handbook of Applied Cryptography" CRC Press, Inc., 1996, pp. 489-541.
Schneier, Bruce "Applied Cryptography 2nd Edition: Protocols, algorithms, and source code in C," 1996, pp. 59-60.
"Survey on 'Status of Identity Authentication Technologies,'" Security Center of Information Technology Promotion Agency, japan, Mar. 2003, pp. 13-19 and an English translation.
Kato, T. et al., "Development of Anonymous Authentication System for Personal Data Protection," pp. 569-574 (English abstract).
A Study on Authentication Mechanism of WWW System Using IC Cards, Toshiaki Tanaka, Satoshi Hada and Mitsuru Yamada KDD R&D Labs, pp. 3-363 to 3-364 (English Summary).
The Progress of Tri-Element Peer Authentication (TePA) and Access Control Method, Tracks for Standard & Technology, Jun. 2009, http://www.its.cesi.cn), p. 21-23.
Chinese 2nd Office Action corresponding to Application No. 201210063055.8; dated Aug. 11, 2016, with English translation.
Jianjun Li et al., "Introduction to Electronic Commerce" Harbin institute of Technology Press, Harbin, Jul. 2011, paragraph 2, p. 162,with English explanation of relevance.
Qiansheng Fu, "E-commerce Tutorial" National Defense Industry Press, Beijing, Jun. 2011, second to the last paragraph, p. 262, with English explanation of relevance.
Extended European Search Report corresponding to Application No. 09753496.0-1870/2282444 PCT/CN2009/072023; dated Oct. 26, 2016.
Japanese First Office Action corresponding to Application No. 2014-561277; dated Nov. 4, 2015, with English translation.
"Information technology—Security techniques—Anonymous digital signatures—Part 1: General," ISO/IEC IS20008-1; Jun. 2013, Version 2.1, pp. 1-31.
U.S. Non Final Office Action for related U.S. Appl. No. 14/512,576 dated May 3, 2018.
D. Slamanig et al., "Anonymous But Authorized Transactions Supporting Selective Traceability," Security and Cryptography (SECRYPT), Proceedings of the 2010 International Conference on, IEEE, Jul. 26, 2010, pp. 1-10, XP031936447.
European Search Report corresponding to Application No. 11839216.6-1853/2639998 PCT/CN2011076296; dated Sep. 1, 2017.

* cited by examiner

METHOD, DEVICE, AND SYSTEM FOR IDENTITY AUTHENTICATION

CROSS REFERENCE TO RELATED APPLICATION

This application is a national phase of International Application No. PCT/CN2013/072497, titled "Method, device, and system for identity authentication", filed on Mar. 12, 2013, which claims priority to Chinese patent application No. 201210063650.1 titled "METHOD AND SYSTEM FOR IDENTITY AUTHENTICATION" and filed with the State Intellectual Property Office on Mar. 12, 2012, which is incorporated herein by reference in its entirety.

FIELD

The present disclosure relates to the field of identity authentication, and in particular to a method, device and system for identity authentication.

BACKGROUND

In today's society, people pay more and more attention to the protection of their privacy. In many cases that the resident status is needed to be verified, it is undesired for a person that his identity information is disclosed to an authenticator while the legality of the identity information is verified, so adequately protecting the privacy is required. For example, in the case that a vote is taken on some sensitive issues, a voter not only hopes to complete the vote by his legal identity, but also does not hope to expose his identity. In some consumption occasions, a consumer does not hope that his personal information is tolerant by a merchant when a payment is made. After logging on to the network by a controllable identity, a network user does not hope that his identity information is disclosed to the public in many cases. Presently, the demand for protecting such privacy becomes more and more apparent.

There are many kinds of techniques for proving identity authentication service. Presently, the identity authentication method based on public-key cryptography is commonly used. This method verifies the legality of the identity of the peer by means of a digital signature, while the identity information of the peer is disclosed to the authenticator. Apparently, there is limitation for such technique when it is used to provide the authentication service in the above-mentioned applications, thus it can not protect the user's privacy. In another respect, it is necessary to provide traceability by the identity authentication technique which provides privacy protection, such that an administrator can perform control as needed.

SUMMARY

In order to solve the problem in the background that it is impossible to protect individual privacy by the present identity authentication technique and it is necessary to provide traceability by an authentication technique containing individual privacy, a method, device and system for identity authentication are provided.

An identity authentication method is provided according to an embodiment of the disclosure, which includes steps of:

1) transmitting, by a first authenticator, a first identity authentication message to a second authenticator;

2) transmitting, by the second authenticator, a second identity authentication message to an authentication server, wherein the second identity authentication message includes an identification of a security domain in which the second authenticator is located;

3) verifying, by the authentication server, after having received the second identity authentication message, legality of the security domain in which the second authenticator is located according to the second identity authentication message, to generate a verification result for the security domain in which the second authenticator is located;

4) returning, by the authentication server, a third identity authentication message to the second authenticator, wherein the third identity authentication message includes the verification result for the security domain in which the second authenticator is located and the identity authentication information of the authentication server for the information including the verification result for the security domain in which the second authenticator is located;

5) transmitting, by the second authenticator, after having received the third identity authentication message, a fourth identity authentication message to the first authenticator, wherein the fourth identity authentication message includes the identification of the security domain in which the second authenticator is located, the verification result for the security domain in which the second authenticator is located, the identity authentication information of the authentication server for the information including the verification result for the security domain in which the second authenticator is located and the identity authentication information of the second authenticator for the information including an identifier of the first authenticator; and 6) verifying, by the first authenticator, after having received the fourth identity authentication message, the fourth identity authentication message and determining legality of an identity of the second authenticator according to the verification result.

A first authentication device is provided according to an embodiment of the disclosure, which includes:

a transmitting unit configured to transmit a first identity authentication message to a second authentication device;

a receiving unit configured to receive a fourth identity authentication message returned from the second authentication device; and a verification unit configured to verify the fourth identity authentication message and determine the legality of the identity of the second authentication device according to the verification result.

A second authentication device is provided according to an embodiment of the disclosure, which includes:

a transmitting unit configured to transmit a second identity authentication message to an authentication server, wherein the second identity authentication message includes the identification of the security domain in which the second authentication device is located; and a receiving unit configured to receive a third identity authentication message returned from the authentication server, wherein after the receiving unit has received the third identity authentication message returned from the authentication server, the transmitting unit transmits a fourth identity authentication message to a first authentication device, the fourth identity authentication message includes the identification of the security domain in which the second authentication device is located, the verification result for the security domain in which the second authentication device is located, the identity authentication information of the authentication server for the information including the verification result for the security domain in which the second authentication device is located and the identity authentication information of the second authentication device for the information including the identifier of the first authentication device.

An authentication server is provided according to an embodiment of the disclosure, which includes:

a receiving unit configured to receive a second identity authentication message sent by a second authentication device;

a verification unit configured to verify the legality of the security domain in which the second authentication device is located according to the second identity authentication message, to generate the verification result for the security domain in which the second authentication device is located; and a transmitting unit configured to return a third identity authentication message to the second authentication device, wherein the third identity authentication message includes the verification result for the security domain in which the second authentication device is located and the identity authentication information of the authentication server for the information including the verification result for the security domain in which the second authentication device is located.

An identity authentication system is provided according to the disclosure, which implements the identity authentication method according to claim 1, wherein the identity authentication system includes a first authentication device, a second authentication device, the security domain in which the second authentication device is located and an authentication server; and wherein during the identity authentication between the first authentication device and the second authentication device, the first authentication device exchanges information only with the second authentication device, and the authentication server exchanges information only with the second authentication device.

According to embodiments of the disclosure, during the authentication, the second authenticator completes authentication anonymously, thereby the privacy of the second authenticator is protected while being authenticated.

BRIEF DESCRIPTION OF THE DRAWINGS

The accompanying drawings described herein are included to provide a further understanding of the disclosure, which constitute a part of this specification, but they are not intended to limit the scope of the disclosure. In the accompanying drawings.

DETAILED DESCRIPTION

Figure 1:
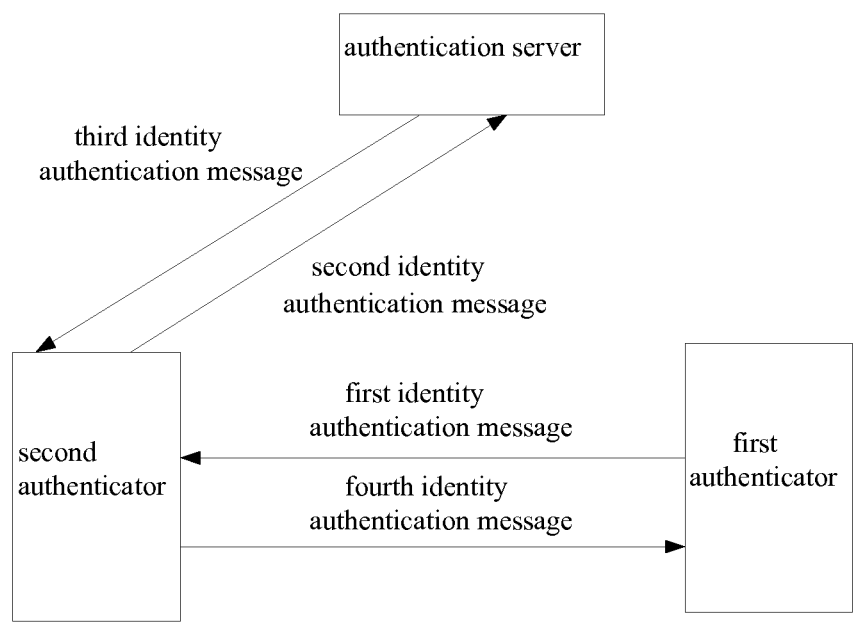
FIG. 1 is a schematic flowchart of an identity authentication method according to an embodiment of the disclosure.

To make the object, technical solutions and advantages of the disclosure more clear, in the following, the disclosure will be illustrated in detail in conjunction with embodiments and the accompanying drawings. Herein, the schematic embodiments of the disclosure and the illustration thereof are used to explain the disclosure, and are not intended to limit the scope of the disclosure.

The system according to the disclosure includes a first authentication device, a second authentication device, the security domain in which the second authentication device is located and an authentication server. The first authentication device and the second authentication device may be an authentication device and a peer device with each other. The first authentication device has own public authentication information and private authentication information, the private authentication information is used to generate the identity authentication information for authenticating the first authentication device by other authentication device, and the public authentication information is disclosed to the public so that other authentication device verifies the identity authentication information of the first authentication device by using the public authentication information. The first authentication device has an identification which may be the identifier of the first authentication device, or may also be the identity certification information of the first authentication device. The security domain is a logical partition with a boundary in which the entities share certain public authentication information. The entities in the security domain each has own private authentication information which is used to generate the identity authentication information for authenticating the entity by other authentication device, and the public authentication information of the security domain is disclosed to the public in order that the other authentication device verifies the identity authentication information of the entity by using the public authentication information. The security domain has an identification which may be the identifier of the security domain, or may also be the identity certification information of the security domain. The authentication server is configured to provide authentication service as a trusted third party for the authentication device to assist the authentication device to complete the identity authentication of the peer device. The authentication server has private authentication information and the corresponding public authentication information, the public authentication information is disclosed to other entities for verifying the identity authentication information generated by the authentication server using the private authentication information. During the process of implementing the identity authentication between the first authentication device and the second authentication device by the system according to the disclosure, the first authentication device exchanges information only with the second authentication device (the specific content for the information exchange refers to an identity authentication method according to the disclosure), and the authentication server exchanges information only with the second authentication device (the specific content for the information exchange refers to the identity authentication method according to the disclosure).

The identity authentication method according to the disclosure includes steps of:

step 1): transmitting, by a first authenticator, a first identity authentication message to a second authenticator;

step 2): transmitting, by the second authenticator, a second identity authentication message to an authentication server, wherein the second identity authentication message includes an identification of a security domain in which the second authenticator is located;

step 3): authenticating, by the authentication server, after having received the second identity authentication message, the legality of the security domain in which the second authenticator is located according to the identification of the security domain in which the second authenticator is located;

step 4): returning, by the authentication server, a third identity authentication message to the second authenticator, wherein the third identity authentication message includes the verification result for the security domain in which the second authenticator is located and the identity authentication information of the authentication server for the information including the verification result for the security domain in which the second authenticator is located;

step 5): transmitting, by the second authenticator, after having received the third identity authentication message, a fourth identity authentication message to the first authenticator, wherein the fourth identity authentication message includes the identification of the security domain in which the second authenticator is located, the verification result from the authentication server for the security domain in which the second authenticator is located, the identity authentication information of the authentication server for the information including the verification result for the security domain in which the second authenticator is located and the identity authentication information of the second authenticator for the information including the identifier of the first authenticator; and step 6): verifying, by the first authenticator, after having received the fourth identity authentication message, the fourth identity authentication message and determining legality of the identity of the second authenticator according to the verification result.

In an embodiment, the first identity authentication message may further include a first time-varying parameter which is generated by the first authenticator. The first time-varying parameter may be a time stamp, a sequence number or a random number. The second identity authentication message may further include the first time-varying parameter. The identity authentication information of the authentication server in the third identity authentication message may further include the first time-varying parameter. The identity authentication information of the second authenticator in the fourth identity authentication message may further include the first time-varying parameter.

Specifically, in the above-mentioned step 3), the following procedure may be adopted by the authentication server to verify the legality of the security domain in which the second authenticator is located.

In the second identity authentication message, if the identification of the security domain in which the second authenticator is located is the identifier of the security domain in which the second authenticator is located, the authentication server looks up the valid public authentication information of the security domain in which the second authenticator is located; if the identification of the security domain in which the second authenticator is located is the identity certification information of the security domain in which the second authenticator is located, the authentication server checks the validity of the identity certification information of the security domain in which the second authenticator is located.

In the above-mentioned step 5), the first authenticator verifies the fourth identity authentication message and determines the legality of the second authenticator according to the verification result, of which the specific implementation may include steps of:

1) verifying, by the first authenticator, whether the identity authentication information from the authentication server is valid, and verifying whether the first time-varying parameter generated by the first authenticator in the first identity authentication message corresponds to the first time-varying parameter included in the identity authentication information of the authentication server in the case that the identity authentication information of the authentication server includes the first time-varying parameter; proceeding to step 2) in a case that the identity authentication information from the authentication server is valid and the first time-varying parameter generated by the first authenticator in the first identity authentication message corresponds to the first time-varying parameter included in the identity authentication information from the authentication server; or otherwise, determining that the second authenticator is illegal;

2) proceeding to step 3) in a case that the security domain in which the second authenticator is located is determined by the first authenticator to be legal according to the verification result from the authentication server for the security domain in which the second authenticator is located; or otherwise, determining that the second authenticator is illegal; and 3) acquiring, by the first authenticator, the public authentication information of the security domain in which the second authenticator is located, verifying whether the identity authentication information of the second authenticator is valid according to the public authentication information, checking whether the identifier of the first authenticator is the same as the identifier of the first authenticator included in the identity authentication information of the second authenticator, and checking whether the first time-varying parameter generated by the first authenticator in the first identity authentication message is the same as the first time-varying parameter included in the identity authentication information of the second authenticator when the identity authentication information of the second authenticator includes the first time-varying parameter; determining that the second authenticator is legal, in a case that the identity authentication information of the second authenticator is valid, the identifier of the first authenticator corresponds to the identifier of the first authenticator included in the identity authentication information of the second authenticator, and the first time-varying parameter generated by the first authenticator in the first identity authentication message corresponds to the first time-varying parameter included in the identity authentication information of the second authenticator; or otherwise, determining that the second authenticator is illegal.

Furthermore, the first identity authentication message further includes an identification of the first authenticator. The second identity authentication message further includes the identification of the first authenticator. The authentication server verifies the legality of the first authenticator according to the identification of the first authenticator, to generate the verification result for the first authenticator by the authentication server. The verification result for the first authenticator by the authentication server is added in the third identity authentication message.

Accordingly, in step 5), after having determined that the identity of the second authenticator is legal, the first authenticator may transmit a fifth identity authentication message to the second authenticator. The fifth identity authentication message includes the identity authentication information of the first authenticator. After having received the fifth identity authentication message, the second authenticator verifies the fifth identity authentication message and determines the legality of the identity of the first authenticator according to the verification result.

Furthermore, in other embodiment, the second identity authentication message may further include a second time-varying parameter which is generated by the second authenticator. The second time-varying parameter may be a time stamp, a sequence number or a random number. The identity authentication information of the authentication server for the information including the verification result for the first authenticator, which is included in the third identity authentication message, may further include the second time-varying parameter.

The second authenticator verifies the fifth identity authentication message and determines the legality of the identity of the first authenticator according to the verification result, and there are two specific ways for implementation.

The first way includes steps of:

1) verifying, by the second authenticator, whether the identity authentication information of the authentication server for the information including the verification result for the first authenticator is valid, and checking whether the second time-varying parameter generated by the second authenticator in the second identity authentication message is the same as the second time-varying parameter included in the identity authentication information of the authentication server for the information including the second time-varying parameter in a case that the identity authentication information of the authentication server includes the second time-varying parameter; proceeding to step 2), in a case that the identity authentication information is valid and the second time-varying parameter generated by the second authenticator in the second identity authentication message is the same as the second time-varying parameter included in the identity authentication information of the authentication server for the information including the second time-varying parameter; or otherwise, determining that the first authenticator is illegal;

2) proceeding to step 3), in a case that the first authenticator is determined by the second authenticator to be legal according to the verification result for the first authenticator by the authentication server; or otherwise, determining that the first authenticator is illegal; and 3) acquiring, by the second authenticator, the public authentication information of the first authenticator, verifying whether the identity authentication information of the first authenticator is valid according to the public authentication information, checking whether the identifier of the security domain in which the second authenticator is located is the same as the identifier of the security domain in which the second authenticator is located which is included in the identity authentication information of the first authenticator, and checking whether the fourth time-varying parameter generated by the second authenticator in the fifth identity authentication message is the same as the fourth time-varying parameter included in the identity authentication information of the first authenticator when the identity authentication information of the first authenticator includes the fourth time-varying parameter; determining that the first authenticator is legal, in a case that the identity authentication information of the first authenticator is valid, the identifier of the security domain in which the second authenticator is located is the same as the identifier of the security domain in which the second authenticator is located which is included in the identity authentication information of the first authenticator, and the fourth time-varying parameter generated by the second authenticator in the fifth identity authentication message is the same as the fourth time-varying parameter included in the identity authentication information of the first authenticator; or otherwise, determining that the first authenticator is illegal.

In the second way, before transmitting the fourth identity authentication message to the first authenticator, the second authenticator firstly verifies whether the identity authentication information of the authentication server for the information including the verification result for the first authenticator is valid, and checks whether the second time-varying parameter generated by the second authenticator in the second identity authentication message is the same as the second time-varying parameter included in the identity authentication information from the authentication server for the information including the verification result for the first authenticator when the identity authentication information of the authentication server includes the second time-varying parameter. The second authenticator transmits the fourth identity authentication message to the first authenticator, in the case that it is verified that the identity authentication information of the authentication server for the information including the verification result for the first authenticator is valid and the second time-varying parameter generated by the second authenticator in the second identity authentication message is the same as the second time-varying parameter included in the identity authentication information of the authentication server for the information including the verification result for the first authenticator. Therefore, the verifying, by the second authenticator, the first authenticator further includes steps of:

1) proceeding to step 2), in a case that the first authenticator is determined by the second authenticator as legal according to the verification result for the first authenticator by the authentication server; or otherwise, determining that the first authenticator is illegal; and 2) acquiring, by the second authenticator, the public authentication information of the first authenticator, verifying whether the identity authentication information of the first authenticator is valid according to the public authentication information, and checking whether the identifier of the security domain in which the second authenticator is located is the same as the identifier of the security domain in which the second authenticator is located which is included in the identity authentication information of the first authenticator and checking whether the fourth time-varying parameter generated by the second authenticator in the fifth identity authentication message is the same as the fourth time-varying parameter included in the identity authentication information of the first authenticator; determining that the first authenticator is legal, in a case that the identity authentication information of the first authenticator is valid and the identifier of the security domain in which the second authenticator is located is the same as the identifier of the security domain in which the second authenticator is located which is included in the identity authentication information of the first authenticator and the fourth time-varying parameter generated by the second authenticator in the fifth identity authentication message is the same as the fourth time-varying parameter included in the identity authentication information of the first authenticator; or otherwise, determining that the first authenticator is illegal.

In the above-mentioned step 3), there are two ways for authenticating, by the authentication server, the legality of the security domain in which the second authenticator is located according to the identification of the security domain in which the second authenticator is located.

In the first way, in a case that the identification of the security domain in which the second authenticator is located in the second identity authentication message is the identifier of the security domain in which the second authenticator is located, the authentication server looks for the public authentication information of the security domain in which the second authenticator is located. It is determined that the security domain in which the second authenticator is located is legal in a case that the public authentication information is found; or otherwise, it is determined that the security domain in which the second authenticator is located is illegal.

In the second way, in a case that the identification of the security domain in which the second authenticator is located in the second identity authentication message is the identity certification information of the security domain in which the second authenticator is located, the authentication server checks the validity of the identity certification information of the security domain in which the second authenticator is located. It is determined that the security domain in which the second authenticator is located is legal, in a case that the identity certification information is valid; or otherwise, determining that the security domain in which the second authenticator is located is illegal.

Additionally, in other embodiment, before the step 1), the second authenticator transmits the zero-th identity authentication message to the first authenticator. The zero-th identity authentication message includes the identification of the security domain in which the second authenticator is located. Accordingly, the identification of the security domain in which the second authenticator is located in the fourth identity authentication message is removed. The first identity authentication message further includes the identification of the first authenticator. The second identity authentication message further includes the identification of the first authenticator. The authentication server verifies the legality of the first authenticator according to the second identity authentication message, to generate the verification result for the first authenticator. The third identity authentication message is adjusted as follows. The verification result for the first authenticator and the identity authentication information of the authentication server for the information including the verification result for the first authenticator are added in the third identity authentication message. Alternatively, the third identity authentication message is added by the verification result for the first authenticator, and the identity authentication information of the authentication server in the third identity authentication message further includes the verification result for the first authenticator. The identity authentication information of the authentication server for the information including the verification result for the first authenticator is the new identity authentication information which is added in the third identity authentication message. The identity authentication information of the authentication server in the third identity authentication message further including the verification result for the first authenticator means that the verification result for the first authenticator is added in the original identity authentication information of the authentication server. Before transmitting the fourth identity authentication information, the second authenticator verifies the third identity authentication information and determines the legality of the first authenticator according to the verification result. Furthermore, a third time-varying parameter which is generated by the second authenticator may be added in the zero-th identity authentication message. The third time-varying parameter may be a time stamp, a sequence number or a random number. The third time-varying parameter is added in the first identity authentication message, and the identity authentication information of the first authenticator in the first identity authentication message further includes the third time-varying parameter. Therefore, the specific implementation for "before transmitting the fourth identity authentication message, the second authenticator verifies the third identity authentication message and determines the legality of the first authenticator according to the verification result" in this paragraph, includes:

5.1) verifying, by the second authenticator, whether the identity authentication information of the authentication server for the information including the verification result for the first authenticator is valid; proceeding to step 5.2), in a case that the identity authentication information is valid; or otherwise, determining that the first authenticator is illegal;

5.2) proceeding to step 5.3), in a case that the first authenticator is determined by the second authenticator as legal according to the verification result for the first authenticator from the authentication server; or otherwise, determining that the first authenticator is illegal; and 5.3) acquiring, by the second authenticator, the public authentication information of the first authenticator, verifying whether the identity authentication information of the first authenticator is valid according to the public authentication information, checking whether the identifier of the security domain in which the second authenticator is located is the same as the identifier of the security domain in which the second authenticator is located which is included in the identity authentication information of the first authenticator, and checking whether the third time-varying parameter generated by the second authenticator in the zero-th identity authentication message is the same as the third time-varying parameter included in the identity authentication information of the first authenticator when the identity authentication information of the first authenticator further includes a third time-varying parameter; determining that the first authenticator is legal, in a case that the identity authentication information of the first authenticator is valid, the identifier of the security domain in which the second authenticator is located is the same as the identifier of the security domain in which the second authenticator is located which is included in the identity authentication information of the first authenticator, and the third time-varying parameter generated by the second authenticator in the zero-th identity authentication message corresponds to the third time-varying parameter included in the identity authentication information of the first authenticator; or otherwise, determining that the first authenticator is illegal.

In the disclosure, the first identity authentication message, the second identity authentication message and the third identity authentication message may further include an optional field respectively.

Figure 2:
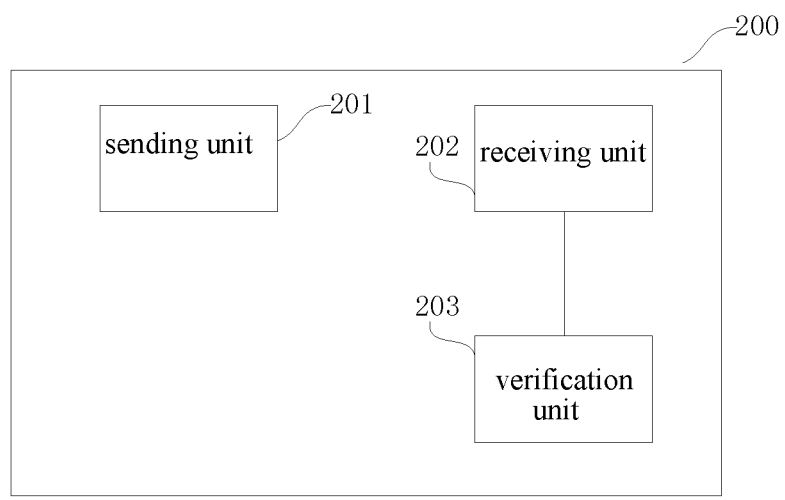
FIG. 2 is a structural schematic diagram of a first authentication device according to an embodiment of the disclosure.

As shown in FIG. 2, FIG. 2 is a structural schematic diagram of a first authentication device according to an embodiment of the disclosure.

In this embodiment, the first authentication device 200 includes a transmitting unit 201, a receiving unit 202 and a verification unit 203.

The transmitting unit 201 is configured to transmit a first identity authentication message to a second authentication device.

The receiving unit 202 is connected to the verification unit 203, and the receiving unit 202 is configured to receive a fourth identity authentication message returned from the second authentication device. The verification unit 203 is configured to verify the fourth identity authentication message and determine the legality of the identity of the second authentication device according to the verification result.

The transmitting unit 201 is further configured to transmit a fifth identity authentication message to the second authentication device. The fifth identity authentication message includes the identity authentication information of the first authentication device for the information including the identifier of the second authentication device.

Figure 3:
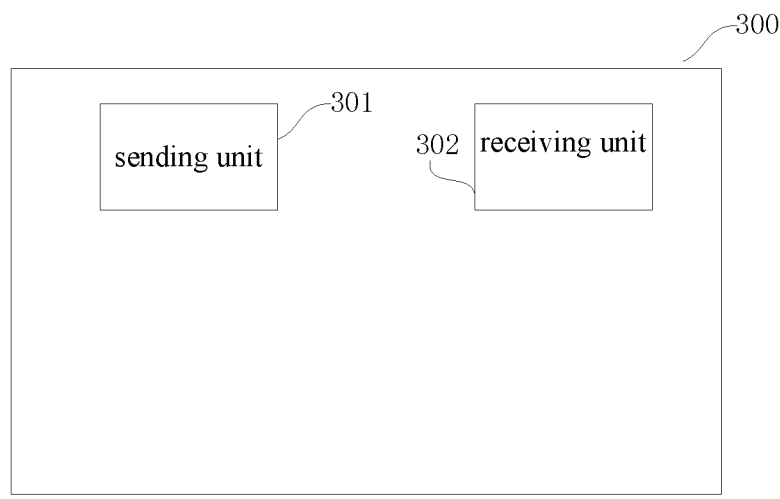
FIG. 3 is a structural schematic diagram of a second authentication device according to an embodiment of the disclosure.

As shown in FIG. 3, FIG. 3 is a structural schematic diagram of a second authentication device according to an embodiment of the disclosure.

In this embodiment, the second authentication device 300 includes a transmitting unit 301 and a receiving unit 302.

The transmitting unit 301 is configured to transmit a second identity authentication message to an authentication server, and the second identity authentication message includes the identification of the security domain in which the second authentication device is located.

The receiving unit 302 is configured to receive a third identity authentication message returned from the authentication server.

After the receiving unit 302 has received the third identity authentication message returned from the authentication server, the transmitting unit 301 transmits a fourth identity authentication message to the first authentication device. The fourth identity authentication message includes the identification of the security domain in which the second authentication device is located, the verification result for the security domain in which the second authentication device is located, the identity authentication information of the authentication server for the information including the verification result for the security domain in which the second authentication device is located and the identity authentication information from the second authentication device for the information including the identifier of the first authentication device.

The receiving unit 302 is further configured to receive a fifth identity authentication message sent by the first authentication device.

The second authentication device 300 further includes a verification unit configured to verify the legality of the identity of the first authentication device.

Figure 4:
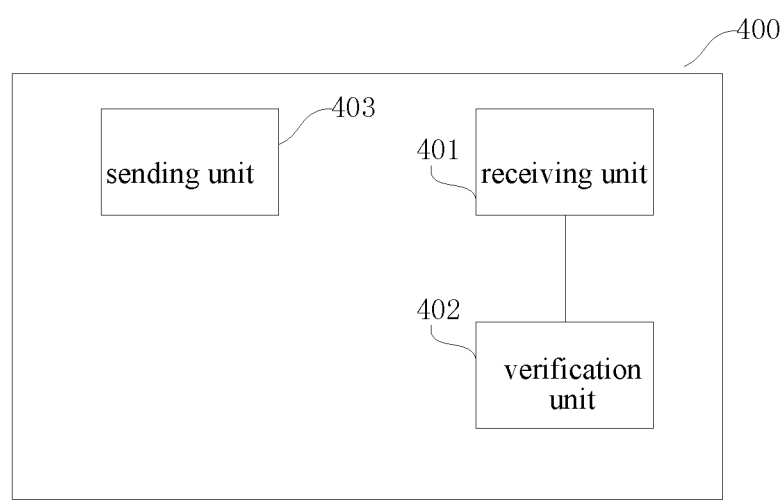
FIG. 4 is a structural schematic diagram of an authentication server according to an embodiment of the disclosure.

As shown in FIG. 4, FIG. 4 is a structural schematic diagram of an authentication server according to an embodiment of the disclosure.

In this embodiment, the authentication server 400 includes a receiving unit 401, a verification unit 402 and a transmitting unit 403.

The receiving unit 401 is configured to receive a second identity authentication message sent by the second authentication device.

The verification unit 402 is connected to the receiving unit 401. The verification unit 402 is configured to verify the legality of the security domain in which the second authentication device is located according to the second identity authentication message, to generate the verification result for the security domain in which the second authentication device is located.

The transmitting unit 403 is configured to return a third identity authentication message to the second authentication device. The third identity authentication message includes the verification result for the security domain in which the second authentication device is located and the identity authentication information of the authentication server for the information including the verification result for the security domain in which the second authentication device is located.

In order to facilitate an understanding of the identity authentication method according to the disclosure, hereinafter three preferred embodiments are provided.

First Preferred Embodiment

The first preferred embodiment is a preferred embodiment for implementing the identity authentication of a second authenticator by a first authenticator, which includes the following steps.

In step 1): the first authenticator transmits a first identity authentication message to the second authenticator, and the first identity authentication message includes a first time-varying parameter generated by the first authenticator and a first optional field.

In step 2): the second authenticator transmits a second identity authentication message to an authentication server, and the second identity authentication message includes a first time-varying parameter, an identification of a security domain in which the second authenticator is located and a second optional field.

In step 3): after having received the second identity authentication message, the authentication server verifies the legality of the security domain in which the second authenticator is located according to the identification of the security domain in which the second authenticator is located.

The following procedure may be adopted by the authentication server to verify the legality of the security domain in which the second authenticator is located.

In the second identity authentication message, if the identification of the security domain in which the second authenticator is located is the identifier of the security domain in which the second authenticator is located, the authentication server looks up the valid public authentication information of the security domain in which the second authenticator is located; if the identification of the security domain in which the second authenticator is located is the identity certification information of the security domain in which the second authenticator is located, the authentication server checks the validity of the identity certification information of the security domain in which the second authenticator is located.

In step 4): after having verified the legality of the security domain in which the second authenticator is located, the authentication server returns a third identity authentication message to the second authenticator; the third identity authentication message includes the verification result from the authentication server for the security domain in which the second authenticator is located, and the identity authentication information of the authentication server for the information including the verification result for the security domain in which the second authenticator is located, a first time-varying parameter and a third optional field.

In step 5): after having received the third identity authentication message, the second authenticator transmits a fourth identity authentication message to the first authenticator; the fourth identity authentication message includes the identification of the security domain in which the second authenticator is located, the verification result from the authentication server for the security domain in which the second authenticator is located, the identity authentication information of the authentication server for the information including the verification result for the security domain in which the second authenticator is located, the first time-varying parameter and the third optional field, and the identity authentication information of the second authenticator for the information including the identifier of the security domain in which the second authenticator is located, the first time-varying parameter and a sixth optional field.

In step 6): after having received the fourth identity authentication message, the first authenticator verifies the fourth identity authentication message and determines the legality of the identity of the second authenticator according to the verification result. The process is as follows.

6.1) the first authenticator verifies whether the identity authentication information of the authentication server for the information including the verification result for the security domain in which the second authenticator is located, the first time-varying parameter and the third optional field is valid according to the public authentication information of the authentication server, and checks whether the first time-varying parameter generated by the first authenticator in the first identity authentication message is the same as the first time-varying parameter included in the identity authentication information of the authentication server for the information including the verification result for the security domain in which the second authenticator is located, the first time-varying parameter and the third optional field when the identity authentication information from the authentication server includes the first time-varying parameter; 6.2) is performed in the case that the identity authentication information of the authentication server for the information including the verification result for the security domain in which the second authenticator is located, the first time-varying parameter and the third optional field is valid, and the first time-varying parameter generated by the first authenticator in the first identity authentication message is the same as the first time-varying parameter included in the identity authentication information of the authentication server for the information including the verification result for the security domain in which the second authenticator is located, the first time-varying parameter and the third optional field; or otherwise, it is determined that the second authenticator is illegal.

6.2) the first authenticator obtains the verification result for the security domain in which the second authenticator is located; 6.3) is performed in the case that it is determined that the security domain in which the second authenticator is located is valid according to the verification result; or otherwise, it is determined that the second authenticator is illegal.

6.3) the first authenticator acquires the public authentication information of the security domain in which the second authenticator is located, verifies whether the identity authentication information of the second authenticator is valid according to the public authentication information, and checks whether the first time-varying parameter generated by the first authenticator in the first identity authentication message is the same as the first time-varying parameter included in the identity authentication information of the second authenticator in a case that the identity authentication information of the second authenticator includes the first time-varying parameter; it is determined that the second authenticator is legal, in a case that the identity authentication information of the second authenticator is valid, and the first time-varying parameter generated by the first authenticator in the first identity authentication message is the same as the first time-varying parameter included in the identity authentication information of the second authenticator; or otherwise, it is determined that the second authenticator is illegal.

By means of the identity authentication process of the second authenticator by the first authenticator, the first authenticator may verify the legality of the identity of the second authenticator, and the identity information of the second authenticator is protected from being exposed.

Second Preferred Embodiment

The second preferred embodiment is a preferred embodiment for implementing the mutual identify authentication between the first authenticator and the second authenticator, which includes the following steps.

In step 1): the first authenticator transmits a first identity authentication message to the second authenticator, and the first identity authentication message includes a first time-varying parameter generated by the first authenticator, an identification of the first authenticator and a first optional field.

In step 2): after having received the first identity authentication message, the second authenticator transmits a second identity authentication message to an authentication server, and the second identity authentication message includes a first time-varying parameter generated by the first authenticator, a second time-varying parameter generated by the second authenticator, an identification of the security domain in which the second authenticator is located, the identification of the first authenticator and a second optional field.

In step 3): after having received the second identity authentication message, the authentication server verifies the legality of the first authenticator and the security domain in which the second authenticator is located according to the identification of the security domain in which the second authenticator is located and the identification of the first authenticator.

The following procedure may be adopted by the authentication server to verify the legality of the first authenticator and the security domain in which the second authenticator is located.

In the second identity authentication message, if the identification of the security domain in which the second authenticator is located is the identifier of the security domain in which the second authenticator is located, the authentication server looks up the valid public authentication information of the security domain in which the second authenticator is located; if the identification of the security domain in which the second authenticator is located is the identity certification information of the security domain in which the second authenticator is located, the authentication server checks the validity of the identity certification information of the security domain in which the second authenticator is located. If the identification of the first authenticator is the identifier of the first authenticator, the authentication server looks up the valid public authentication information of the first authenticator; if the identification of the first authenticator is the identity certification information of the first authenticator, the authentication server checks the validity of the identity certification information of the first authenticator.

In step 4): after having verified the legality of the first authenticator and the security domain in which the second authenticator is located, the authentication server returns a third identity authentication message to the second authenticator.

The third identity authentication message may be the message including the verification result from the authentication server for the security domain in which the second authenticator is located, the verification result for the first authenticator by the authentication server, the identity authentication information of the authentication server for the information including the verification result for the security domain in which the second authenticator is located, a first time-varying parameter and a fourth optional field, and the identity authentication information of the authentication server for the information including the verification result for the first authenticator, the second time-varying parameter and a fifth optional field.

The third identity authentication message may be a message including the verification result from the authentication server for the security domain in which the second authenticator is located, the verification result for the first authenticator by the authentication server, and the identity authentication information of the authentication server for the information including the verification result for the security domain in which the second authenticator is located, the first time-varying parameter, the verification result for the first authenticator, the second time-varying parameter generated by the second authenticator and a sixth optional field.

In step 5): after having received the third identity authentication message, the second authenticator transmits a fourth identity authentication message to the first authenticator; the fourth identity authentication message includes the identification of the security domain in which the second authenticator is located, the first time-varying parameter, a fourth time-varying parameter, the verification result from the authentication server for the security domain in which the second authenticator is located, the identity authentication information of the authentication server for the information including the verification result for the security domain in which the second authenticator is located, the first time-varying parameter and the fourth optional field, the identity authentication information of the second authenticator for the information including the first time-varying parameter, the fourth time-varying parameter, the identifier of the first authenticator, the identifier of the security domain in which the second authenticator is located and a seventh optional field, and an eighth optional field.

In step 6): after having received the fourth identity authentication message, the first authenticator verifies the fourth identity authentication message. The process is as follows.

6.1) the first authenticator verifies whether the identity authentication information of the authentication server for the information including the verification result for the security domain in which the second authenticator is located, the first time-varying parameter and the fourth optional field or the identity authentication information of the authentication server for the information including the verification result for the security domain in which the second authenticator is located, the first time-varying parameter, the verification result for the first authenticator, the second time-varying parameter and the sixth optional field is valid according to the public authentication information from the authentication server, and verifies whether the first time-varying parameter generated by the first authenticator in the first identity authentication message is the same as the first time-varying parameter included in the identity authentication information of the authentication server for the information including the verification result for the security domain in which the second authenticator is located, the first time-varying parameter and the fourth optional field or the identity authentication information of the authentication server for the information including the verification result for the security domain in which the second authenticator is located, the first time-varying parameter, the verification result for the first authenticator, the third time-varying parameter and the sixth optional field in a case that the identity authentication information of the authentication server includes the first time-varying parameter; 6.2) is performed in the case that the identity authentication information of the authentication server for the information including the verification result for the security domain in which the second authenticator is located, the first time-varying parameter and the fourth optional field or the identity authentication information from the authentication server for the information including the verification result for the security domain in which the second authenticator is located, the first time-varying parameter, the verification result for the first authenticator, the second time-varying parameter and the sixth optional field is valid, and the first time-varying parameter generated by the first authenticator in the first identity authentication message is the same as the first time-varying parameter included in the identity authentication information of the authentication server for the information including the verification result for the security domain in which the second authenticator is located, the first time-varying parameter and the fourth optional field or the identity authentication information of the authentication server for the information including the verification result for the security domain in which the second authenticator is located, the first time-varying parameter, the verification result for the first authenticator, the third time-varying parameter and the sixth optional field; or otherwise, it is determined that the second authenticator is illegal and the authentication process ends or step 7) is performed.

6.2) the first authenticator obtains the verification result by the authentication server for the security domain in which the second authenticator is located; 6.3) is performed in the case that it is determined that the security domain in which the second authenticator is located is valid according to the verification result; or otherwise, it is determined that the second authenticator is illegal and the authentication process ends or step 7) is performed.

6.3) the first authenticator acquires the public authentication information of the security domain in which the second authenticator is located, verifies whether the identity authentication information of the second authenticator is valid according to the public authentication information, checks whether the identifier of the first authenticator is the same as the identifier of the first authenticator included in the identity authentication information of the second authenticator, and checks whether the first time-varying parameter generated by the first authenticator in the first identity authentication message is the same as the first time-varying parameter included in the identity authentication information of the second authenticator when the identity authentication information of the second authenticator includes the first time-varying parameter; it is determined that the second authenticator is legal, in a case that the identity authentication information of the second authenticator is valid, the identifier of the first authenticator is the same as the identifier of the first authenticator included in the identity authentication information of the second authenticator and the first time-varying parameter generated by the first authenticator in the first identity authentication message is the same as the first time-varying parameter included in the identity authentication information of the second authenticator; or otherwise, it is determined that the second authenticator is illegal, the first authenticator completes the authentication of the second authenticator and step 7) is performed.

In step 7): the first authenticator transmits a fifth identity authentication message to the second authenticator, and the fifth identity authentication message is the identity authentication information of the first authenticator for the information including the first time-varying parameter, the fourth time-varying parameter, the identifier of the first authenticator, the identifier of the security domain in which the second authenticator is located and a ninth optional field.

In step 8): after having received the fifth identity authentication message, the second authenticator verifies the fifth identity authentication message. The process is as follows.

8.1) the second authenticator verifies whether the identity authentication information of the authentication server is valid according to the public authentication information of the authentication server, and checks whether the second time-varying parameter generated by the second authenticator in the second identity authentication message is the same as the second time-varying parameter included in the identity authentication information of the authentication server when the identity authentication information from the authentication server includes the second time-varying parameter; 8.2) is performed, in a case that the identity authentication information from the authentication server is valid and the second time-varying parameter generated by the second authenticator in the second identity authentication message is the same as the second time-varying parameter included in the identity authentication information of the authentication server; or otherwise, it is determined that the first authenticator is illegal;

8.2) the second authenticator obtains the verification result from the authentication server for the first authenticator; 8.3) is performed in the case that it is determined that the first authenticator is legal according to the verification result; or otherwise, it is determined that the first authenticator is illegal; thereby the second authenticator implements the authentication of the first authenticator.

8.3) the second authenticator acquires the public authentication information of the first authenticator, verifies whether the identity authentication information of the first authenticator is valid according to the public authentication information, checks whether the identifier of the security domain in which the second authenticator is located is the same as the identifier of the security domain in which the second authenticator is located which is included in the identity authentication information of the first authenticator, and checks whether the fourth time-varying parameter generated by the second authenticator in the fourth identity authentication message corresponds to the fourth time-varying parameter included in the identity authentication information of the first authenticator when the identity authentication information of the first authenticator includes the fourth time-varying parameter; it is determined that the first authenticator is legal, in a case that the identity authentication information of the first authenticator is valid, the identifier of the security domain in which the second authenticator is located is the same as the identifier of the security domain in which the second authenticator is located which is included in the identity authentication information of the first authenticator, and the fourth time-varying parameter generated by the second authenticator in the fourth identity authentication message is the same as the fourth time-varying parameter included in the identity authentication information of the first authenticator; or otherwise, it is determined that the first authenticator is illegal. The second authenticator completes the authentication of the first authenticator.

The above-mentioned 8.1) may be performed in the above-mentioned step 5), that is, in the above-mentioned step 5), after the second authenticator has received the third identity authentication message and before the second authenticator transmits the fourth identity authentication message to the first authenticator, "the second authenticator verifies whether the identity authentication information of the authentication server is valid according to the public authentication information from the authentication server, and checks whether the second time-varying parameter generated by the second authenticator in the second identity authentication message corresponds to the second time-varying parameter included in the identity authentication information from the authentication server when the identity authentication information from the authentication server includes the second time-varying parameter, and verifies whether the identity authentication information of the authentication server is valid and checks whether the first time-varying parameter generated by the second authenticator in the second identity authentication message is the same as the first time-varying parameter included in the identity authentication information of the authentication server" in the 8.1) is performed firstly, and if the verification is passed successfully, then the second authenticator transmits the fourth identity authentication message to the first authenticator, and immediately proceeds to step 8.2) when proceeds to step 8).

By means of the mutual authentication process between the first authenticator and the second authenticator, the legality of the identity is authenticated mutually between two entities, and the identity information of the second authenticator is prevented from being exposed.

Third Preferred Embodiment

This preferred embodiment is a preferred embodiment for implementing the mutual identify authentication between the first authenticator and the second authenticator, which includes the following steps.

In step 0): the second authenticator transmits a zero-th identity authentication message to the first authenticator, and the zero-th identity authentication message includes a third time-varying parameter generated by the second authenticator, an identification of the security domain in which the second authenticator is located and a first optional field.

In step 1): the first authenticator transmits a first identity authentication message to the second authenticator; the first identity authentication message includes a first time-varying parameter generated by the first authenticator, the third time-varying parameter generated by the second authenticator, a second optional field, and the identity authentication message of the first authenticator for information including an identification of the first authenticator, the first time-varying parameter generated by the first authenticator, the third time-varying parameter generated by the second authenticator, the identification of the security domain in which the second authenticator is located and a third optional field.

In step 2): after having received the first identity authentication message, the second authenticator transmits a second identity authentication message to an authentication server, and the second identity authentication message includes the first time-varying parameter generated by the first authenticator, the second time-varying parameter generated by the second authenticator, the identification of the security domain in which the second authenticator is located, the identification of the first authenticator and a fourth optional field.

In step 3): after having received the second identity authentication message, the authentication server verifies the legality of the first authenticator and the security domain in which the second authenticator is located according to the identification of the security domain in which the second authenticator is located and the identification of the first authenticator.

The following procedure may be adopted when the authentication server verifies the legality of the first authenticator and the security domain in which the second authenticator is located.

In the second identity authentication message, if the identification of the security domain in which the second authenticator is located is the identifier of the security domain in which the second authenticator is located, the authentication server looks up the valid public authentication information of the security domain in which the second authenticator is located; if the identification of the security domain in which the second authenticator is located is the identity certification information of the security domain in which the second authenticator is located, the authentication server checks the validity of the identity certification information of the security domain in which the second authenticator is located. If the identification of the first authenticator is the identifier of the first authenticator, the authentication server looks up the valid public authentication information of the first authenticator; if the identification of the first authenticator is the identity certification information of the first authenticator, the authentication server checks the validity of the identity certification information of the first authenticator.

In step 4): the authentication server returns a third identity authentication message to the second authenticator.

The third identity authentication message may be the message including the verification result from the authentication server for the security domain in which the second authenticator is located, the verification result for the first authenticator by the authentication server, the identity authentication information of the authentication server for the information including the verification result for the security domain in which the second authenticator is located, the first time-varying parameter and a fifth optional field, and the identity authentication information of the authentication server for the information including the verification result for the first authenticator, the second time-varying parameter and a sixth optional field.

The third identity authentication message may further be a message including the verification result by the authentication server for the security domain in which the second authenticator is located, the verification result for the first authenticator by the authentication server, and the identity authentication information of the authentication server for the information including the verification result for the security domain in which the second authenticator is located, the first time-varying parameter, the verification result for the first authenticator, the second time-varying parameter and a seventh optional field.

In step 5): after having received the third identity authentication message, the second authenticator transmits a fourth identity authentication message to the first authenticator; the fourth identity authentication message includes the identification of the security domain in which the second authenticator is located, the third time-varying parameter, the verification result by the authentication server for the security domain in which the second authenticator is located, the identity authentication information of the authentication server for the information including the verification result for the security domain in which the second authenticator is located, the first time-varying parameter and the fourth optional field, the identity authentication information of the second authenticator for the information including the first time-varying parameter, the third time-varying parameter, the identifier of the first authenticator, the identifier of the security domain in which the second authenticator is located and a seventh optional field, and a eighth optional field. Before the fourth identity authentication message is sent, the following process is performed.

5.1) the second authenticator verifies whether the identity authentication information from the authentication server is valid according to the public authentication information from the authentication server, and checks whether the second time-varying parameter generated by the second authenticator in the second identity authentication message is the same as the second time-varying parameter included in the identity authentication information from the authentication server; 5.2) is performed, in a case that the identity authentication information from the authentication server is valid and the second time-varying parameter generated by the second authenticator in the second identity authentication message is the same as the second time-varying parameter included in the identity authentication information by the authentication server; or otherwise, it is determined that the first authenticator is illegal;

5.2) the second authenticator obtains the verification result for the first authenticator by the authentication server; 5.3) is performed in the case that it is determined that the first authenticator is legal according to the verification result; or otherwise, it is determined that the first authenticator is illegal.

5.3) the second authenticator acquires the public authentication information of the first authenticator, verifies whether the identity authentication information of the first authenticator is valid according to the public authentication information, checks whether the identifier of the security domain in which the second authenticator is located is the same as the identifier of the security domain in which the second authenticator is located which is included in the identity authentication information of the first authenticator, and checks whether the third time-varying parameter generated by the second authenticator in the zero-th identity authentication message is the same as the third time-varying parameter included in the identity authentication information of the first authenticator when the identity authentication information of the first authenticator includes the third time-varying parameter; it is determined that the first authenticator is legal, in a case that the identity authentication information of the first authenticator is valid, the identifier of the security domain in which the second authenticator is located corresponds to the identifier of the security domain in which the second authenticator is located which is included in the identity authentication information of the first authenticator, and the third time-varying parameter generated by the second authenticator in the zero-th identity authentication message is the same as the third time-varying parameter included in the identity authentication information of the first authenticator; or otherwise, it is determined that the first authenticator is illegal.

In step 6): after having received the fourth identity authentication message, the first authenticator verifies the fourth identity authentication message. The process is as follows.

6.1) the first authenticator verifies whether the identity authentication information of the authentication server is valid according to the public authentication information from the authentication server, and checks whether the first time-varying parameter generated by the first authenticator in the first identity authentication message is the same as the first time-varying parameter included in the identity authentication information of the authentication server when the identity authentication information of the authentication server includes the first time-varying parameter; 6.2) is performed in the case that the identity authentication information from the authentication server is valid, and the first time-varying parameter generated by the first authenticator in the first identity authentication message is the same as the first time-varying parameter included in the identity authentication information by the authentication server; or otherwise, it is determined that the second authenticator is illegal.

6.2) the first authenticator obtains the verification result by the authentication server for the security domain in which the second authenticator is located; 6.3) is performed in the case that it is determined that the security domain in which the second authenticator is located is valid according to the verification result; or otherwise, it is determined that the second authenticator is illegal.

6.3) the first authenticator acquires the public authentication information of the security domain in which the second authenticator is located, verifies whether the identity authentication information of the second authenticator is valid according to the public authentication information, checks whether the identifier of the first authenticator is the same as the identifier of the first authenticator included in the identity authentication information of the second authenticator, and checks whether the first time-varying parameter generated by the first authenticator in the first identity authentication message is the same as the first time-varying parameter included in the identity authentication information of the second authenticator when the identity authentication information of the second authenticator includes the first time-varying parameter; it is determined that the second authenticator is legal, in a case that the identity authentication information of the second authenticator is valid, the identifier of the first authenticator corresponds to the identifier of the first authenticator included in the identity authentication information of the second authenticator, and the first time-varying parameter generated by the first authenticator in the first identity authentication message corresponds to the first time-varying parameter included in the identity authentication information of the second authenticator; or otherwise, it is determined that the second authenticator is illegal Thereby, the first authenticator completes the authentication of the second authenticator.

By means of the mutual authentication process between the first authenticator and the second authenticator, the legality of the identity is authenticated mutually between two entities, and the identity information of the second authenticator is prevented from being exposed.

The existence and content for the first optional field, the second optional field, the third optional field etc. described as above are uncertain, of which the meaning is mainly that it is considered that an implementer may define the content for the optional field as required in order to achieve the extension. Therefore, in other embodiments, the optional field may be omitted.

The private authentication information of the first authenticator described as above may be the information such as a private key in the public key cipher system in the field of information security.

The private authentication information of the second authenticator described as above may be the information such as an anonymous signature secret key in the public key cipher system in the field of information security.

The second time-varying parameter and the third time-varying parameter described as above are a time-varying parameter generated by the second authenticator. They may be same, or may be different.

The identity authentication information of the first authenticator or the authentication server described as above may be the information generated by computation using the private authentication information and adopting information security technology such as a digital signature.

The identity authentication information of the second authenticator described as above may be the information generated by computation using the private authentication information and adopting information security technology such as an anonymous digital signature.

In the detailed description described above, the object, technical solutions and advantageous effects of the present disclosure have been illustrated in detail. It is to be understood that, what is described above are only the preferred embodiments of the present disclosure and are not intended to define the scope of protection of the present disclosure. Any changes, equivalent substitutions, improvements and so on made within the spirit and principles of the present disclosure are all contained in the scope of protection of the present disclosure.

What is claimed is:

1. An identity authentication method, comprising:
   1) transmitting, by a first authenticator, a first identity authentication message to a second authenticator, wherein the first identity authentication message comprises a first time-varying parameter which is generated by the first authenticator;
   2) transmitting, by the second authenticator, a second identity authentication message to an authentication server, wherein the second identity authentication message comprises an identification of a security domain in which the second authenticator is located, wherein the security domain is a logical partition with a boundary in which the second authenticator and at least one entity share certain public authentication information which is a public key, the second authenticator and the at least one entity in the security domain each has own private authentication information which is used to generate the identity authentication information for authenticating the entity by other authentication device, and the private authentication information is a private key or an anonymous signature secret key;
   3) verifying, by the authentication server, after having received the second identity authentication message, legality of the security domain in which the second authenticator is located according to the second identity authentication message, to generate a verification result for the security domain in which the second authenticator is located;
   4) returning, by the authentication server, a third identity authentication message to the second authenticator, wherein the third identity authentication message comprises the verification result for the security domain in which the second authenticator is located and the identity authentication information of the authentication server for the information including the verification result for the security domain in which the second authenticator is located;
   5) transmitting, by the second authenticator, after having received the third identity authentication message, a fourth identity authentication message to the first authenticator, wherein the fourth identity authentication message comprises the identification of the security domain in which the second authenticator is located, the verification result for the security domain in which the second authenticator is located, the identity authentication information of the authentication server for the information including the verification result for the security domain in which the second authenticator is located and the identity authentication information of the second authenticator for the information including an identifier of the first authenticator and the first time-varying parameter; and 6) verifying, by the first authenticator, after having received the fourth identity authentication message, the fourth identity authentication message including verifying the first time-varying parameter in the fourth identity authentication message, and determining legality of an identity of the second authenticator according to the verification result, wherein the step 6) comprises steps of:

6.1) verifying, by the first authenticator, whether the identity authentication information of the authentication server is valid; proceeding to step 6.2) in a case that the identity authentication information of the authentication server is valid; or otherwise, determining that the second authenticator is illegal;

6.2) proceeding to step 6.3) in a case that the security domain in which the second authenticator is located is determined by the first authenticator to be legal according to the verification result for the security domain in which the second authenticator is located; or otherwise determining that the second authenticator is illegal; and 6.3) acquiring, by the first authenticator, the public authentication information of the security domain in which the second authenticator is located, verifying whether the identity authentication information of the second authenticator is valid according to the public authentication information, and checking whether the identifier of the first authenticator is the same as the identifier of the first authenticator included in the identity authentication information of the second authenticator; determining that the second authenticator is legal, in a case that the identity authentication information of the second authenticator is valid and the identifier of the first authenticator is the same as the identifier of the first authenticator included in the identity authentication information of the second authenticator; or otherwise, determining that the second authenticator is illegal.

2. The identity authentication method according to claim 1, wherein the verifying, by the authentication server, legality of the security domain in which the second authenticator is located according to the second identity authentication message in step 3) further comprises:

looking up, by the authentication server, public authentication information of the security domain in which the second authenticator is located, if the identification of the security domain in which the second authenticator is located in the second identity authentication message is the identifier of the security domain in which the second authenticator is located; determining that the security domain in which the second authenticator is located is legal, in a case that the public authentication information of the security domain in which the second authenticator is located is found; or otherwise, determining that the security domain in which the second authenticator is located is illegal; or checking, by the authentication server, the validity of the identity certification information of the security domain in which the second authenticator is located, if the identification of the security domain in which the second authenticator is located in the second identity authentication message is the identity certification information of the security domain in which the second authenticator is located; determining that the security domain in which the second authenticator is located is legal, in a case that the identity certification information of the security domain in which the second authenticator is located is valid; or otherwise, determining that the security domain in which the second authenticator is located is illegal.

3. The identity authentication method according to claim 1, wherein the second identity authentication message in step 2) further comprises the first time-varying parameter;

the identity authentication information of the authentication server in the third identity authentication message in step 4) further comprises the first time-varying parameter;

the identity authentication information of the second authenticator in the fourth identity authentication message in step 5) further comprises the first time-varying parameter; and the verifying, by the first authenticator, the fourth identity authentication message and determining legality of the second authenticator according to the verification result in step 6), comprises steps of:

6.1) verifying, by the first authenticator, whether the identity authentication information of the authentication server is valid, and verifying whether the first time-varying parameter generated by the first authenticator in the first identity authentication message is the same as the first time-varying parameter included in the identity authentication information of the authentication server; proceeding to step 6.2) in a case that the identity authentication information of the authentication server is valid and the first time-varying parameter generated by the first authenticator in the first identity authentication message is the same as the first time-varying parameter included in the identity authentication information of the authentication server; or otherwise, determining that the second authenticator is illegal;

6.2) proceeding to step 6.3) in a case that the security domain in which the second authenticator is located is determined by the first authenticator to be legal according to the verification result for the security domain in which the second authenticator is located; or otherwise, determining that the second authenticator is illegal; and 6.3) acquiring, by the first authenticator, the public authentication information of the security domain in which the second authenticator is located, verifying whether the identity authentication information of the second authenticator is valid according to the public authentication information, checking whether the identifier of the first authenticator is the same as the identifier of the first authenticator included in the identity authentication information of the second authenticator, and checking whether the first time-varying parameter generated by the first authenticator in the first identity authentication message is the same as the first time-varying parameter included in the identity authentication information of the second authenticator; determining that the second authenticator is legal, in a case that the identity authentication information of the second authenticator is valid, the identifier of the first authenticator is the same as the identifier of the first authenticator included in the identity authentication information of the second authenticator, and the first time-varying parameter generated by the first authenticator in the first identity authentication message corresponds to the first time-varying parameter included in the identity authentication information of the second authenticator; or otherwise, determining that the second authenticator is illegal.

4. The identity authentication method according to claim 1, wherein
the first identity authentication message in step 1) further comprises the identification of the first authenticator;
the second identity authentication message in step 2) further comprises the identification of the first authenticator;
the identity authentication method further comprises in step 3): verifying, by the authentication server, the legality of the first authenticator according to the second identity authentication message, to generate the verification result for the first authenticator;
in step 4), the third identity authentication message further comprises the verification result of the first authenticator and the identity authentication information of the authentication server for the information including the verification result of the first authenticator; or the third identity authentication message further comprises the verification result of the first authenticator, and the identity authentication information of the authentication server in the third identity authentication message further comprises the verification result of the first authenticator; and
the identity authentication method further comprises steps of:
7) transmitting, by the first authenticator, a fifth identity authentication message to the second authenticator, wherein the fifth identity authentication message comprises the identity authentication information of the first authenticator for the information including the identifier of the second authenticator; and
8) verifying, by the second authenticator, after having received the fifth identity authentication message, the legality of the identity of the first authenticator.

5. The identity authentication method according to claim 4, wherein the verifying, by the authentication server, the legality of the first authenticator according to the second identity authentication message in step 3) further comprises:
looking for, by the authentication server, the public authentication information of the first authenticator, in a case that the identification of the first authenticator in the second identity authentication message is the identifier of the first authenticator; determining that the first authenticator is legal, in a case that the public authentication information is found; or otherwise, determining that the first authenticator is illegal; or
verifying, by the authentication server, the validity of the identity certification information, in a case that the identification of the first authenticator in the second identity authentication message is the identity certification information of the first authenticator; determining that the first authenticator is legal, in a case that the identity certification information is valid; or otherwise, determining that the first authenticator is illegal.

6. The identity authentication method according to claim 4, wherein the verifying, by the second authenticator, the legality of the first authenticator in step 8) further comprises steps of:

8.1) verifying, by the second authenticator, whether the identity authentication information of the authentication server for the information including the verification result of the first authenticator is valid; proceeding to step 8.2), in a case that the identity authentication information is valid; or otherwise, determining that the first authenticator is illegal;
8.2) proceeding to step 8.3), in a case that the first authenticator is determined by the second authenticator to be legal according to the verification result of the first authenticator by the authentication server; or otherwise, determining that the first authenticator is illegal; and
8.3) acquiring, by the second authenticator, the public authentication information of the first authenticator, verifying whether the identity authentication information of the first authenticator is valid according to the public authentication information, and checking whether the identifier of the security domain in which the second authenticator is located is the same as the identifier of the security domain in which the second authenticator is located which is included in the identity authentication information of the first authenticator; determining that the first authenticator is legal, in a case that the identity authentication information of the first authenticator is valid and the identifier of the security domain in which the second authenticator is located is the same as the identifier of the security domain in which the second authenticator is located which is included in the identity authentication information of the first authenticator; or otherwise, determining that the first authenticator is illegal.

7. The identity authentication method according to claim 4, wherein
in step 5), before transmitting the fourth identity authentication message to the first authenticator, the second authenticator verifies whether the identity authentication information of the authentication server for the information including the verification result of the first authenticator is valid; and in the case that it is verified that the identity authentication information of the authentication server for the information including the verification result of the first authenticator is valid, the second authenticator transmits the fourth identity authentication message to the first authenticator; and
in step 8), the verifying, by the second authenticator, the legality of the first authenticator further comprises steps of:
8.1) proceeding to step 8.2), in a case that the first authenticator is determined by the second authenticator to be legal according to the verification result of the first authenticator by the authentication server; or otherwise, determining that the first authenticator is illegal; and
8.2) acquiring, by the second authenticator, the public authentication information of the first authenticator, verifying whether the identity authentication information of the first authenticator is valid according to the public authentication information, and checking whether the identifier of the security domain in which the second authenticator is located is the same as the identifier of the security domain in which the second authenticator is located which is included in the identity authentication information of the first authenticator; determining that the first authenticator is legal, in a case that the identity authentication information of the first authenticator is valid and the identifier of the security domain in which the second authenticator is located is the same as the identifier of the security domain in which the second authenticator is located which is included in the identity authentication information of the first authenticator; or otherwise, determining that the first authenticator is illegal.

8. The identity authentication method according to claim 4, wherein
in step 2), the second identity authentication message further comprises a second time-varying parameter which is generated by the second authenticator;
in step 3), the identity authentication information of the authentication server for the information including the verification result of the first authenticator in the third identity authentication message further comprises a second time-varying parameter;
in step 5), the fourth identity authentication message further comprises a fourth time-varying parameter generated by the second authenticator; and
in step 8), the verifying, by the second authenticator, the legality of the first authenticator further comprises steps of:
8.1) verifying, by the second authenticator, whether the identity authentication information of the authentication server for the information including the verification result of the first authenticator is valid, and checking whether the second time-varying parameter generated by the second authenticator in the second identity authentication message is the same as the second time-varying parameter included in the identity authentication information of the authentication server for the information including the second time-varying parameter; proceeding to step 8.2), in a case that the identity authentication information is valid and the second time-varying parameter generated by the second authenticator in the second identity authentication message is the same as the second time-varying parameter included in the identity authentication information of the authentication server for the information including the second time-varying parameter; or otherwise, determining that the first authenticator is illegal;
8.2) proceeding to step 8.3), in a case that the first authenticator is determined by the second authenticator to be legal according to the verification result of the first authenticator from the authentication server; or otherwise, determining that the first authenticator is illegal; and
8.3) acquiring, by the second authenticator, the public authentication information of the first authenticator, verifying whether the identity authentication information of the first authenticator is valid according to the public authentication information, checking whether the identifier of the security domain in which the second authenticator is located is the same as the identifier of the security domain in which the second authenticator is located which is included in the identity authentication information of the first authenticator, and checking whether the fourth time-varying parameter generated by the second authenticator in the fourth identity authentication message is the same as the fourth time-varying parameter included in the identity authentication information of the first authenticator; determining that the first authenticator is legal, in a case that the identity authentication information of the first authenticator is valid, and the identifier of the security domain in which the second authenticator is located is the same as the identifier of the security domain in which the second authenticator is located which is included in the identity authentication information of the first authenticator, and the fourth time-varying parameter generated by the second authenticator in the fourth identity authentication message is the same as the fourth time-varying parameter included in the identity authentication information of the first authenticator; or otherwise, determining that the first authenticator is illegal.

9. The identity authentication method according to claim 4, wherein
in step 2), the second identity authentication message further comprises a second time-varying parameter which is generated by the second authenticator;
in step 3), the identity authentication information of the authentication server for the information including the verification result of the first authenticator in the third identity authentication message further comprises a second time-varying parameter;
in step 5), before transmitting the fourth identity authentication message to the first authenticator, the second authenticator firstly verifies whether the identity authentication information of the authentication server for the information including the verification result of the first authenticator is valid, and checks whether the second time-varying parameter generated by the second authenticator in the second identity authentication message is the same as the first time-varying parameter included in the identity authentication information of the authentication server for the information including the verification result of the first authenticator; and in a case that the identity authentication information of the authentication server for the information including the verification result of the first authenticator is valid and the second time-varying parameter generated by the second authenticator in the second identity authentication message is the same as the first time-varying parameter included in the identity authentication information of the authentication server for the information including the verification result of the first authenticator, the second authenticator transmits the fourth identity authentication message to the first authenticator, wherein the fourth identity authentication message further comprises a fourth time-varying parameter generated by the second authenticator; and
in step 8), the verifying, by the second authenticator, the legality of the first authenticator further comprises steps of:
8.1) proceeding to step 8.2), in a case that the first authenticator is determined by the second authenticator to be legal according to the verification result of the first authenticator from the authentication server; or otherwise, determining that the first authenticator is illegal; and
8.2) acquiring, by the second authenticator, the public authentication information of the first authenticator, verifying whether the identity authentication information of the first authenticator is valid according to the public authentication information, checking whether the identifier of the security domain in which the second authenticator is located is the same as the identifier of the security domain in which the second authenticator is located which is included in the identity authentication information of the first authenticator, and checking whether the fourth time-varying parameter generated by the second authenticator in the fourth identity authentication message is the same as the fourth time-varying parameter included in the identity authentication information of the first authenticator;

determining that the first authenticator is legal, in a case that the identity authentication information of the first authenticator is valid, the identifier of the security domain in which the second authenticator is located is the same as the identifier of the security domain in which the second authenticator is located which is included in the identity authentication information of the first authenticator, and the fourth time-varying parameter generated by the second authenticator in the fourth identity authentication message is the same as the fourth time-varying parameter included in the identity authentication information of the first authenticator; or otherwise, determining that the first authenticator is illegal.

10. The identity authentication method according to claim 1, wherein the identity authentication method further comprises:
    step 0) transmitting, by the second authenticator, the zero-th identity authentication message to the first authenticator, wherein the zero-th identity authentication message comprises the identification of the security domain in which the second authenticator is located;
    wherein the first identity authentication message in step 1) further comprises the identification of the first authenticator, and
    the second identity authentication message in step 2) further comprises the identification of the first authenticator; and
    the identity authentication method further comprises: in step 3), verifying, by the authentication server, the legality of the first authenticator according to the second identity authentication message, to generate the verification result of the first authenticator;
    wherein in step 4), the third identity authentication message further comprises the verification result of the first authenticator and the identity authentication information of the authentication server for the information including the verification result of the first authenticator; or the third identity authentication message further comprises the verification result of the first authenticator, and the identity authentication information of the authentication server in the third identity authentication message further comprises the verification result of the first authenticator; and
    the identity authentication method further comprises: in step 5), removing the identification of the security domain in which the second authenticator is located in the fourth identity authentication message; before transmitting the fourth identity authentication message, verifying, by the second authenticator, the third identity authentication message and determining the legality of the first authenticator according to the verification result.

11. The identity authentication method according to claim 10, wherein the verifying, by the authentication server, the legality of the first authenticator according to the second identity authentication message in step 3) further comprises:
    looking for, by the authentication server, the public authentication information of the first authenticator, in a case that the identification of the first authenticator in the second identity authentication message is the identifier of the first authenticator; determining that the first authenticator is legal, in a case that the public authentication information is found; or otherwise, determining that the first authenticator is illegal; or
    verifying, by the authentication server, the validity of the identity certification information, in a case that the identification of the first authenticator in the second identity authentication message is the identity certification information of the first authenticator; determining that the first authenticator is legal, in a case that the identity certification information is valid; or otherwise, determining that the first authenticator is illegal.

12. The identity authentication method according to claim 10, wherein the verifying, by the second authenticator, the third identity authentication message and determining the legality of the first authenticator according to the verification result in step 5) further comprises:
    5.1) verifying, by the second authenticator, whether the identity authentication information of the authentication server for the information including the verification result of the first authenticator is valid; proceeding to step 5.2), in a case that the identity authentication information is valid; or otherwise, determining that the first authenticator is illegal;
    5.2) proceeding to step 5.3), in a case that the first authenticator is determined by the second authenticator to be legal according to the verification result of the first authenticator by the authentication server; or otherwise, determining that the first authenticator is illegal; and
    5.3) acquiring, by the second authenticator, the public authentication information of the first authenticator, verifying whether the identity authentication information of the first authenticator is valid according to the public authentication information, and checking whether the identifier of the security domain in which the second authenticator is located is the same as the identifier of the security domain in which the second authenticator is located which is included in the identity authentication information of the first authenticator; determining that the first authenticator is legal, in a case that the identity authentication information of the first authenticator is valid and the identifier of the security domain in which the second authenticator is located is the same as the identifier of the security domain in which the second authenticator is located which is included in the identity authentication information of the first authenticator; or otherwise, determining that the first authenticator is illegal.

13. The identity authentication method according to claim 10, wherein
    in step 0), the zero-th identity authentication message further comprises a third time-varying parameter which is generated by the second authenticator;
    in step 1), the first identity authentication message further comprises a third time-varying parameter, and the identity authentication information of the first authenticator further comprises a third time-varying parameter;
    in step 5), the verifying, by the second authenticator, the third identity authentication message and determining the legality of the first authenticator according to the verification result further comprises:
    5.1) verifying, by the second authenticator, whether the identity authentication information of the authentication server for the information including the verification result of the first authenticator is valid; proceeding to step 5.2), in a case that the identity authentication information is valid; or otherwise, determining that the first authenticator is illegal;
    5.2) proceeding to step 5.3), in a case that the first authenticator is determined by the second authenticator to be legal according to the verification result of the first authenticator by the authentication server; or otherwise, determining that the first authenticator is illegal; and 5.3) acquiring, by the second authenticator, the public authentication information of the first authenticator, verifying whether the identity authentication information of the first authenticator is valid according to the public authentication information, checking whether the identifier of the security domain in which the second authenticator is located is the same as the identifier of the security domain in which the second authenticator is located which is included in the identity authentication information of the first authenticator, and checking whether the third time-varying parameter generated by the second authenticator in the zero-th identity authentication message is the same as the third time-varying parameter included in the identity authentication information of the first authenticator; determining that the first authenticator is legal, in a case that the identity authentication information of the first authenticator is valid, the identifier of the security domain in which the second authenticator is located is the same as the identifier of the security domain in which the second authenticator is located which is included in the identity authentication information of the first authenticator, and the third time-varying parameter generated by the second authenticator in the zero-th identity authentication message is the same as the third time-varying parameter included in the identity authentication information of the first authenticator; or otherwise, determining that the first authenticator is illegal.

14. A first authentication device, comprising:
a transmitting unit configured to transmit a first identity authentication message, the first identity authentication message comprising a first time-varying parameter which is generated by the first authentication device to a second authentication device in a security domain which is a logical partition with a boundary in which the second authentication device and at least one entity share certain public authentication information which is a public key, wherein the second authentication device and the at least one entity in the security domain each has own private authentication information which is used to generate the identity authentication information for authenticating the entity by other authentication device, and wherein the transmitting unit comprises a transmitter, and the private authentication information is a private key or an anonymous signature secret key;
a receiving unit configured to receive a fourth identity authentication message comprising the first time-varying parameter returned from the second authentication device, wherein the receiving unit comprises a receiver, and wherein the fourth identity authentication message further comprises the identification of the security domain in which the second authentication device is located, the verification result for the security domain in which the second authentication device is located, the identity authentication information of an authentication server for the information including the verification result for the security domain in which the second authentication device is located and the identity authentication information of the second authentication device for the information including an identifier of the first authentication device; and
a verification unit configured to verify the fourth identity authentication message comprising verification of the first time-varying parameter and determine the legality of the identity of the second authentication device according to the verification result, wherein the verification unit comprises a processor and a memory, and the verification unit is implemented when instructions stored in the memory are performed by the processor, and wherein the processor is configured to:
6.1) verify whether the identity authentication information of the authentication server is valid; proceed to step 6.2) in a case that the identity authentication information of the authentication server is valid; or otherwise, determine that the second authentication device is illegal;
6.2) proceed to step 6.3) in a case that the security domain in which the second authentication device is located is determined by the first authentication device to be legal according to the verification result for the security domain in which the second authentication device is located; or otherwise determine that the second authentication device is illegal; and
6.3) acquire the public authentication information of the security domain in which the second authentication device is located, verify whether the identity authentication information of the second authentication device is valid according to the public authentication information, and check whether the identifier of the first authentication device is the same as the identifier of the first authentication device included in the identity authentication information of the second authentication device; determine that the second authentication device is legal, in a case that the identity authentication information of the second authentication device is valid and the identifier of the first authentication device is the same as the identifier of the first authentication device included in the identity authentication information of the second authentication device; or otherwise, determine that the second authentication device is illegal.

15. The first authentication device according to claim 14, wherein
the transmitting unit is further configured to transmit a fifth identity authentication message to the second authentication device, wherein the fifth identity authentication message comprises the identity authentication information of the first authentication device for the information including the identifier of the second authentication device.

16. A second authentication device, comprising:
a transmitting unit configured to transmit a second identity authentication message comprising a first time-varying parameter to an authentication server, wherein the second identity authentication message comprises an identification of a security domain in which the second authentication device is located, wherein the transmitting unit comprises a transmitter, the security domain is a logical partition with a boundary in which the second authentication device and at least one entity share certain public authentication information which is a public key, and the second authentication device and the at least one entity in the security domain each has own private authentication information which is used to generate the identity authentication information for authenticating the entity by other authentication device, and the private authentication information is a private key or an anonymous signature secret key;
a receiving unit configured to:
receive a first identity authentication message sent by a first authentication device, wherein the first identity authentication message comprises the first time-varying parameter, wherein the first time-varying parameter is generated by the first authentication device;

receive a third identity authentication message comprising the first time-varying parameter returned from the authentication server, wherein the receiving unit comprises a receiver, and wherein the third identity authentication message comprises a verification result for the security domain in which the second authentication device is located and the identity authentication information of the authentication server for the information including the verification result for the security domain in which the second authentication device is located; and wherein after the receiving unit has received the third identity authentication message returned from the authentication server, the transmitting unit transmits a fourth identity authentication message comprising the first time-varying parameter to the first authentication device, the fourth identity authentication message comprises the identification of the security domain in which the second authentication device is located, the verification result for the security domain in which the second authentication device is located, the identity authentication information of the authentication server for the information including the verification result for the security domain in which the second authentication device is located and the identity authentication information of the second authentication device for the information including an identifier of the first authentication device and the first time-varying parameter, and wherein the fourth identity authentication message is verified and a legality of the second authentication device is determined by the first authentication device by the following steps of:

6.1) verifying whether the identity authentication information of the authentication server is valid; proceeding to step 6.2) in a case that the identity authentication information of the authentication server is valid; or otherwise, determining that the second authentication device is illegal;

6.2) proceeding to step 6.3) in a case that the security domain in which the second authentication device is located is determined by the first authentication device to be legal according to the verification result for the security domain in which the second authentication device is located; or otherwise determining that the second authentication device is illegal; and 6.3) acquiring the public authentication information of the security domain in which the second authentication device is located, verifying whether the identity authentication information of the second authentication device is valid according to the public authentication information, and checking whether the identifier of the first authentication device is the same as the identifier of the first authentication device included in the identity authentication information of the second authentication device; determining that the second authentication device is legal, in a case that the identity authentication information of the second authentication device is valid and the identifier of the first authentication device is the same as the identifier of the first authentication device included in the identity authentication information of the second authentication device; or otherwise, determining that the second authentication device is illegal.

17. The second authentication device according to claim 16, wherein the receiving unit is further configured to receive a fifth identity authentication message sent by the first authentication device; and the second authentication device further comprises a verification unit configured to verify the legality of the first authentication device, wherein the verification unit comprises a processor and a memory, and the verification unit is implemented when instructions stored in the memory are performed by the processor.

18. An authentication server, comprising:

a receiving unit configured to receive a second identity authentication message comprising a first time-varying parameter sent by a second authentication device, wherein the receiving unit comprises a receiver, wherein the first time-varying parameter is generated by a first authentication device, and wherein the second identity authentication message comprises an identification of a security domain in which the second authentication device is located;

a verification unit configured to verify the legality of the security domain in which the second authentication device is located according to the second identity authentication message, to generate the verification result for the security domain in which the second authentication device is located, wherein the verification unit comprises a processor and a memory, the verification unit is implemented when instructions stored in the memory are performed by the processor, and the security domain is a logical partition with a boundary in which the second authentication device and at least one entity share certain public authentication information which is a public key, and the second authentication device and the at least one entity in the security domain each has own private authentication information which is used to generate the identity authentication information for authenticating the entity by other authentication device, and the private authentication information is a private key or an anonymous signature secret key; and a transmitting unit configured to return a third identity authentication message comprising the first time-varying parameter to the second authentication device, wherein the third identity authentication message comprises the verification result for the security domain in which the second authentication device is located and the identity authentication information of the authentication server for the information including the verification result for the security domain in which the second authentication device is located, wherein the transmitting unit comprises a transmitter, wherein after the second authentication device has received the third identity authentication message returned from the authentication server, the second authentication device transmits a fourth identity authentication message comprising the first time-varying parameter to the first authentication device, and wherein the fourth identity authentication message is verified and a legality of the second authentication device is determined by the first authentication device by the following steps of:

6.1) verifying whether the identity authentication information of the authentication server is valid; proceeding to step 6.2) in a case that the identity authentication information of the authentication server is valid; or otherwise, determining that the second authentication device is illegal;

6.2) proceeding to step 6.3) in a case that the security domain in which the second authentication device is located is determined by the first authentication device to be legal according to the verification result for the security domain in which the second authentication device is located; or otherwise determining that the second authentication device is illegal; and 6.3) acquiring the public authentication information of the security domain in which the second authentication device is located, verifying whether the identity authentication information of the second authentication device is valid according to the public authentication information, and checking whether the identifier of the first authentication device is the same as the identifier of the first authentication device included in the identity authentication information of the second authentication device; determining that the second authentication device is legal, in a case that the identity authentication information of the second authentication device is valid and the identifier of the first authentication device is the same as the identifier of the first authentication device included in the identity authentication information of the second authentication device; or otherwise, determining that the second authentication device is illegal;

wherein the fourth identity authentication message comprises the identification of the security domain in which the second authentication device is located, the verification result for the security domain in which the second authentication device is located, the identity authentication information of the authentication server for the information including the verification result for the security domain in which the second authentication device is located and the identity authentication information of the second authentication device for the information including an identifier of the first authentication device and the first time-varying parameter.

* * * * *